United States Patent
Fujishiro et al.

(10) Patent No.: US 10,820,372 B2
(45) Date of Patent: Oct. 27, 2020

(54) RADIO TERMINAL AND BASE STATION

(71) Applicant: KYOCERA CORPORATION, Kyoto (JP)

(72) Inventors: Masato Fujishiro, Yokohama (JP); Chiharu Yamazaki, Tokyo (JP); Hiroyuki Adachi, Kawasaki (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/185,413

(22) Filed: Nov. 9, 2018

(65) Prior Publication Data
US 2019/0098697 A1  Mar. 28, 2019

Related U.S. Application Data

(63) Continuation of application No. PCT/JP2017/017688, filed on May 10, 2017.
(Continued)

(51) Int. Cl.
  *H04W 88/04* (2009.01)
  *H04W 40/12* (2009.01)
  *H04W 36/00* (2009.01)
  *H04L 29/08* (2006.01)
  *H04W 40/22* (2009.01)
  (Continued)

(52) U.S. Cl.
  CPC ............ *H04W 88/04* (2013.01); *H04L 67/16* (2013.01); *H04W 8/005* (2013.01); *H04W 36/03* (2018.08);
  (Continued)

(58) Field of Classification Search
  None
  See application file for complete search history.

(56) References Cited

U.S. PATENT DOCUMENTS

| | | | |
|---|---|---|---|
| 2005/0094588 A1* | 5/2005 | Wentink | H04W 40/10 370/315 |
| 2009/0185492 A1* | 7/2009 | Senarath | H04B 7/155 370/238 |

(Continued)

OTHER PUBLICATIONS

3rd Generation Partnership Project; "Technical Specification Group Radio Access Network; Evolved Universal Terrestrial Radio Access (E-UTRA) and Evolved Universal Terrestrial Radio Access Network (E-UTRAN)"; 3GPP TS 36.300 V13.3.0; Mar. 2016; pp. 1-295; Release 13; 3GPP Organizational Partners.

*Primary Examiner* — Brian S Roberts
(74) *Attorney, Agent, or Firm* — Studebaker & Brackett PC

(57) ABSTRACT

A radio terminal (controller) executes one of a first control, a second control, and a third control, based on at least one of a reception level of a radio signal from a predetermined cell and a transmission level of the radio terminal. In the first control, the radio terminal directly transmits uplink information to be transmitted to a predetermined cell to the predetermined cell, and directly receives downlink information to be received by the radio terminal from the predetermined cell. In the second control, the radio terminal transmits the uplink information to the predetermined cell via a relay terminal configured to execute a relay using a proximity-based service, and directly receives the downlink information from the predetermined cell. In the third control, the radio terminal transmits the uplink information to the predetermined cell via the relay terminal, and receives the downlink information from the predetermined cell via the relay terminal.

12 Claims, 10 Drawing Sheets

Related U.S. Application Data

(60) Provisional application No. 62/335,913, filed on May 13, 2016.

(51) Int. Cl.
*H04W 76/14* (2018.01)
*H04W 76/11* (2018.01)
*H04W 76/27* (2018.01)
*H04W 8/00* (2009.01)
*H04W 92/18* (2009.01)
*H04W 4/90* (2018.01)
*H04W 80/02* (2009.01)

(52) U.S. Cl.
CPC ........... *H04W 40/12* (2013.01); *H04W 40/22* (2013.01); *H04W 76/11* (2018.02); *H04W 76/14* (2018.02); *H04W 76/27* (2018.02); *H04W 92/18* (2013.01); *H04W 4/90* (2018.02); *H04W 80/02* (2013.01); *Y02D 70/126* (2018.01); *Y02D 70/34* (2018.01); *Y02D 70/39* (2018.01)

(56) References Cited

U.S. PATENT DOCUMENTS

| | | | |
|---|---|---|---|
| 2014/0171062 A1* | 6/2014 | Fallgren | H04W 40/22 455/422.1 |
| 2014/0233454 A1* | 8/2014 | Speight | H04W 88/04 370/315 |
| 2015/0215028 A1* | 7/2015 | Ljung | H04W 88/04 370/315 |
| 2016/0337935 A1* | 11/2016 | Patil | H04W 24/08 |
| 2018/0160287 A1* | 6/2018 | Wu | H04W 4/06 |

* cited by examiner

RADIO TERMINAL AND BASE STATION

CROSS-REFERENCE TO RELATED APPLICATION

The present application is a continuation based on PCT Application No. PCT/JP2017/017688 filed on May 10, 2017, which claims the benefit of U.S. Provisional Application No. 62/335,913 (filed May 13, 2016). The content of which is incorporated by reference herein in their entirety.

FIELD

The present disclosure relates to a radio terminal and a base station used in a communication system.

BACKGROUND

In 3GPP (3rd Generation Partnership Project), which is a project aiming to standardize a mobile communication system, the specifications of proximity-based services (ProSes) have been designed (see Non Patent Document 1).

In the Prose, a specific radio terminal (ProSe UE-to-Network relay) can relay traffic between another radio terminal (remote UE) and a network.

PRIOR ART DOCUMENT

Non-Patent Document

Non Patent Document 1: 3GPP Technical Specification "TS 36.300 V13.3.0" Apr. 1, 2016

SUMMARY

A radio terminal according to one embodiment comprises a controller configured to execute one of a first control, a second control, and a third control. In the first control, the radio terminal directly transmits uplink information to be transmitted to a predetermined cell to the predetermined cell, and directly receives downlink information to be received by the radio terminal from the predetermined cell. In the second control, the radio terminal transmits the uplink information to the predetermined cell via a relay terminal configured to execute a relay using a proximity-based service, and directly receives the downlink information from the predetermined cell. In the third control, the radio terminal transmits the uplink information to the predetermined cell via the relay terminal, and receives the downlink information from the predetermined cell via the relay terminal. The controller selects one of the first control, the second control, and the third control based on at least one of a reception level of a radio signal from the predetermined cell and a transmission level of the radio terminal.

A radio terminal according to one embodiment comprises a receiver configured to receive a sidelink signal for a relay in a proximity-based service from a second terminal; and a controller configured to determine whether the relay can be executed. The controller determines that the relay can be executed when an identifier of a cell included in the sidelink signal indicates a predetermined cell in which the radio terminal is located.

A base station according to one embodiment comprise a transmitter configured to transmit, to a radio terminal configured to execute one of a first control, a second control, and a third control, information of a determination criterion defined by at least one of a reception level of a radio signal from the base station and a transmission level of the radio terminal. In the first control, the base station directly receives, from the radio terminal, uplink information to be transmitted to the base station, and directly transmits, to the radio terminal, downlink information to be received by the radio terminal. In the second control, the base station receives the uplink information from the radio terminal via a relay terminal configured to execute a relay using a proximity-based service, and directly transmits the downlink information to the radio terminal. In the third control, the base station receives the uplink information from the radio terminal via the relay terminal, and transmits the downlink information to the radio terminal via the relay terminal. The determination criterion is used for determining an area in which the second control can be executed.

A base station according to one embodiment comprises a transmitter configured to transmit, to a radio terminal configured to execute one of a first control, a second control, and a third control, information of a determination criterion defined by at least one of a reception level of a radio signal from the base station and a transmission level of the radio terminal. In the first control, the base station directly receives, from the radio terminal, uplink information to be transmitted to the base station, and directly transmits, to the radio terminal, downlink information to be received by the radio terminal. In the second control, the base station receives the uplink information from the radio terminal via a relay terminal configured to execute a relay using a proximity-based service, and directly transmit the downlink information to the radio terminal. In the third control, the base station receives the uplink information from the radio terminal via the relay terminal, and transmits the downlink information to the radio terminal via the relay terminal. The determination criterion is used for determining an area in which the second control can be executed.

A radio terminal according to one embodiment comprises a controller configured to execute one of a first control and a second control. In the first control, the radio terminal directly transmits uplink information to be transmitted to a predetermined cell to the predetermined cell, and directly receives downlink information to be received by the radio terminal from the predetermined cell. In the second control, the radio terminal transmits the uplink information to the predetermined cell via a relay terminal configured to execute a relay using a proximity-based service, and directly receives the downlink information from the predetermined cell. The controller executes the second control in preference to the first control.

DESCRIPTION OF THE EMBODIMENT

Overview of Embodiments

Figure 1:
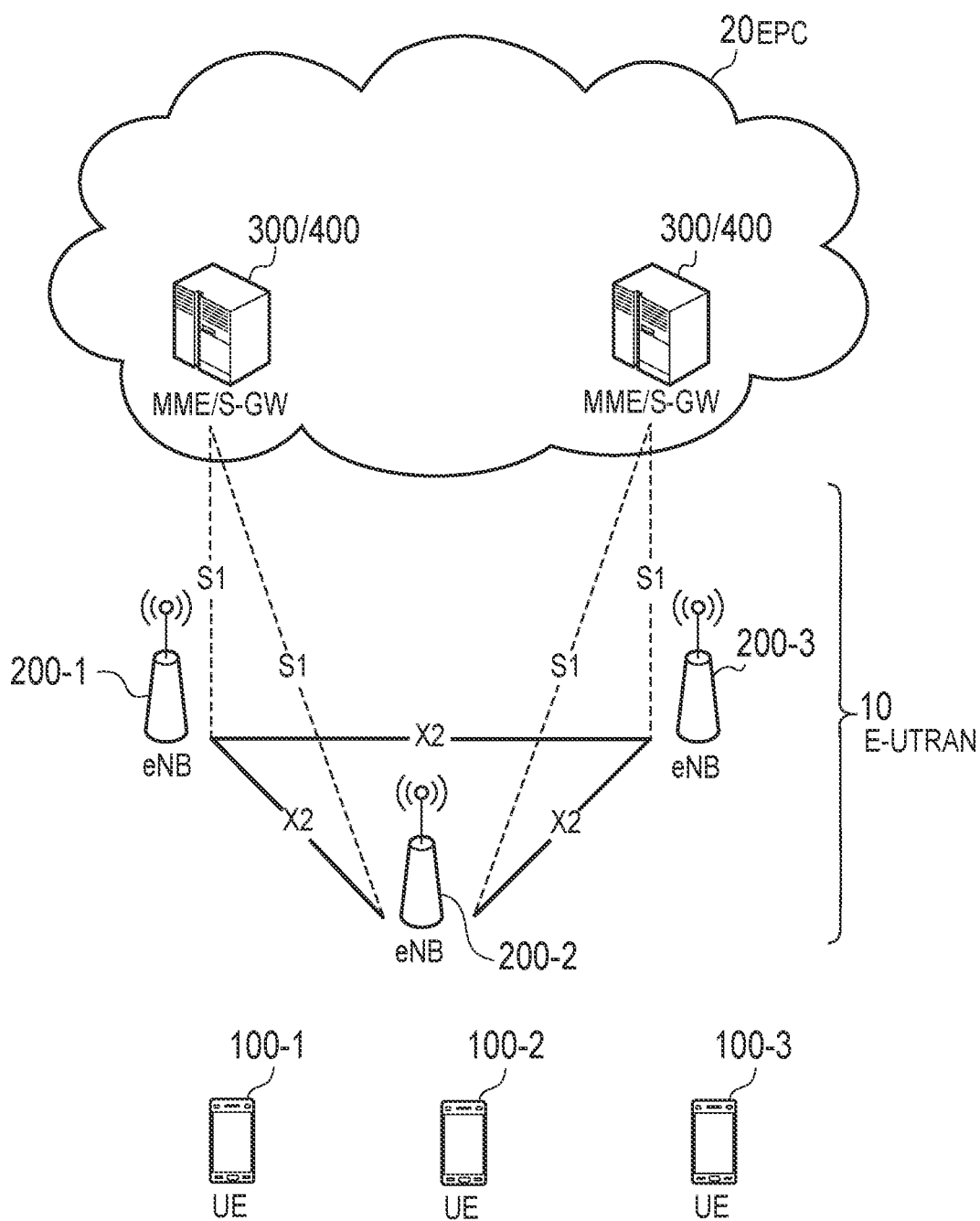
FIG. 1 is a diagram illustrating a configuration of an LTE system.

A radio terminal according to one embodiment may comprise a controller configured to execute one of a first control, a second control, and a third control. In the first control, the radio terminal may directly transmit uplink information to be transmitted to a predetermined cell to the predetermined cell, and directly receives downlink information to be received by the radio terminal from the predetermined cell. In the second control, the radio terminal may transmit the uplink information to the predetermined cell via a relay terminal configured to execute a relay using a proximity-based service, and directly receives the downlink information from the predetermined cell. In the third control, the radio terminal may transmit the uplink information to the predetermined cell via the relay terminal, and receives the downlink information from the predetermined cell via the relay terminal. The controller may select one of the first control, the second control, and the third control based on at least one of a reception level of a radio signal from the predetermined cell and a transmission level of the radio terminal.

The controller may receive information of a second determination criterion defined by at least one of the reception level and the transmission level from the predetermined cell. The second determination criterion may be used for determining an area in which the second control can be executed.

The controller may execute the second control when the second determination criterion is satisfied and a first determination criterion for determining a coverage area of the predetermined cell is not satisfied.

The controller may execute the second control only when the information of the second determination criterion has been received from the predetermined cell.

The controller may receive, from the predetermined cell, information of a transmission power applied for execution of the second control.

The controller may execute the second control when information of a radio resource used for the relay is directly received from the predetermined cell.

The controller may transmit a sidelink signal in the proximity-based service before starting the second control. The sidelink signal may include information for notifying the relay terminal that the radio terminal desires a relay of only the uplink information.

The controller may transmit a sidelink signal in the proximity-based service before starting the second control. The sidelink signal may include an identifier of the predetermined cell that is a transmission source of the downlink information.

The controller may receive a sidelink signal in the proximity-based service before starting the second control. The sidelink signal may include an identifier of a cell in which another radio terminal that is a transmission source of the sidelink signal is located. The controller may determine that the second control can be executed when the identifier of the cell indicates the predetermined cell.

The controller may determine that the second control cannot be executed when the identifier of the cell does not indicate the predetermined cell.

The controller may execute an operation for receiving the downlink information from the cell in which the other radio terminal is located when the identifier of the cell does not indicate the predetermined cell.

When the second control is executed, a first bearer for transmitting the uplink information to the predetermined cell via the relay terminal and a second bearer for directly receiving the downlink information from the predetermined cell may be established. The first bearer and the second bearer may be different.

A radio terminal according to one embodiment may comprise: a receiver configured to receive a sidelink signal for a relay in a proximity-based service from a second terminal; and a controller configured to determine whether the relay can be executed. The controller may determine that the relay can be executed when an identifier of a cell included in the sidelink signal indicates a predetermined cell in which the radio terminal is located.

The controller may determine that the relay cannot be executed when the identifier of the cell does not indicate the predetermined cell.

The controller may start an operation for connecting with the cell indicated by the identifier of the cell when the identifier of the cell does not indicate the predetermined cell.

A base station according to one embodiment may comprise a transmitter configured to transmit, to a radio terminal configured to execute one of a first control, a second control, and a third control, information of a determination criterion defined by at least one of a reception level of a radio signal from the base station and a transmission level of the radio terminal. In the first control, the base station may directly receive, from the radio terminal, uplink information to be transmitted to the base station, and directly transmits, to the radio terminal, downlink information to be received by the radio terminal. In the second control, the base station may receive the uplink information from the radio terminal via a relay terminal configured to execute a relay using a proximity-based service, and directly transmit the downlink information to the radio terminal. In the third control, the base station may receive the uplink information from the radio terminal via the relay terminal, and transmit the downlink information to the radio terminal via the relay terminal. The determination criterion may be used for determining an area in which the second control can be executed.

A radio terminal according to one embodiment may comprise a controller configured to execute one of a first control and a second control. In the first control, the radio terminal may directly transmit uplink information to be transmitted to a predetermined cell to the predetermined cell, and directly receives downlink information to be received by the radio terminal from the predetermined cell. In the second control, the radio terminal may transmit the uplink information to the predetermined cell via a relay terminal configured to execute a relay using a proximity-based service, and directly receive the downlink information from the predetermined cell. The controller may execute the second control in preference to the first control.

The controller may preferentially execute the second control when control information for preferentially executing the second control is received from the predetermined cell.

The controller may transmit, to the predetermined cell, information indicating that the radio terminal prefers the second control.

A base station according to one embodiment may comprise a transmitter configured to transmit, to a radio terminal, control information for the radio terminal to execute a second control in preference to a first control. In the first control, the base station may directly receive, from the radio terminal, uplink information to be transmitted to the base station, and directly transmits, to the radio terminal, downlink information to be received by the radio terminal. In the second control, the base station may receive the uplink information from the radio terminal via a relay terminal configured to execute a relay using a proximity-based service, and may directly transmit the downlink information to the radio terminal.

The base station may further comprise a receiver configured to receive information indicating that the radio terminal prefers the second control from the radio terminal or a network device. The transmitter may transmit the control information to the radio terminal in response to receiving the information.

(Mobile Communication System)

The configuration of the mobile communication system according to the embodiment will be described. FIG. 1 is a diagram illustrating a configuration of a Long Term Evolution (LTE) system.

As illustrated in FIG. 1, the LTE system includes a User Equipment (UE) 100, an Evolved-Universal Terrestrial Radio Access Network (E-UTRAN) 10, and an Evolved Packet Core (EPC) 20.

The UE 100 corresponds to a communication apparatus (radio terminal). The UE 100 is a mobile communication apparatus. The UE 100 performs radio communication with a cell (later described eNB 200). The configuration of the UE 100 will be described later.

The E-UTRAN 10 corresponds to a radio access network. The E-UTRAN 10 includes an evolved Node-B (eNB) 200. The eNB 200 corresponds to a base station. The eNBs 200 are connected to each other via an X2 interface. The configuration of the eNB 200 will be described later.

The eNB 200 manages one or a plurality of cells. The eNB 200 performs radio communication with the UE 100 that has established connection with cells managed by the eNB 200. The eNB 200 has a radio resource management (RRM) function, a routing function of user data (hereinafter, simply referred to as "data"), a measurement control function for mobility control and scheduling, and the like. The "cell" is used as a term indicating the minimum unit of a radio communication area. The "cell" is also used as a term indicating a function of performing radio communication with the UE 100.

The EPC 20 corresponds to a core network. The EPC 20 may constitute a network together with the E-UTRAN 10. The EPC 20 includes an MME (Mobility Management Entity) 300 and an SGW (Serving Gateway) 400

The MME 300 performs, for example, various kinds of mobility control for the UE 100. The SGW 400 performs, for example, data transfer control. The MME 300 and the SGW 400 are connected to the eNB 200 via a S1 interface.

Figure 2:
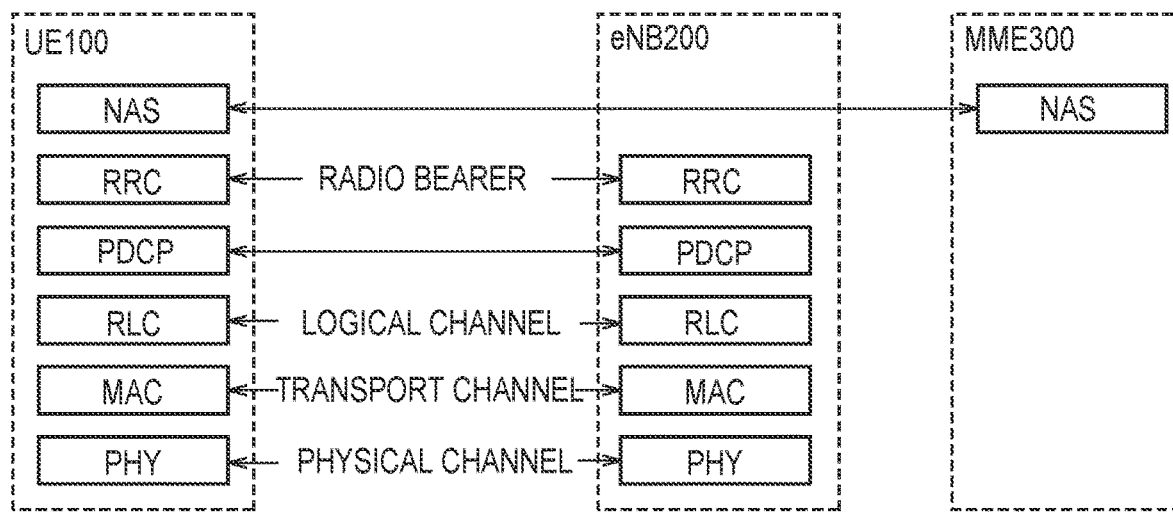
FIG. 2 is a protocol stack diagram of a radio interface in the LTE system.

FIG. 2 is a diagram illustrating protocol stack of a radio interface in the LTE system. As illustrated in FIG. 2, a radio interface protocol is separated into first to third layers of an Open Systems Interconnection (OSI) reference model. The first layer is a physical (PHY) layer. The second layer includes a Medium Access Control (MAC) layer, a Radio Link Control (RLC) layer, and a Packet Data Convergence Protocol (PDCP) layer. The third layer includes a Radio Resource Control (RRC) layer.

The physical layer performs encoding/decoding, modulation/demodulation, antenna mapping/demapping, and resource mapping/demapping. Between the physical layer of the UE 100 and the physical layer of the eNB 200, data and control signal are transferred via a physical channel.

The MAC layer performs data priority control, retransmission processing using a hybrid automatic repeat request (ARQ) (HARQ), a random access procedure, and the like. Between the MAC layer of the UE 100 and the MAC layer of the eNB 200, data and control signal are transferred via a transport channel. The MAC layer of the eNB 200 includes a scheduler (MAC scheduler). The scheduler decides a transport format (transport block size and modulation and coding schemes (MCS)) of uplink and downlink, and a resource block to be allocated to the UE 100.

The RLC layer transfers data to an RLC layer on a reception side using the functions of the MAC layer and the physical layer. Between the RLC layer of the UE 100 and the RLC layer of the eNB 200, data and control information are transferred via a logical channel.

The PDCP layer performs header compression/decompression, and encryption/decryption.

The RRC layer is defined only in a control plane handling control signal. Between the RRC layer of the UE 100 and the RRC layer of the eNB 200, messages (RRC messages) for various configurations are transferred. The RRC layer controls the logical channel, the transport channel, and the physical channel in response to establishment, re-establishment, and release of a radio bearer. If there is connection (RRC connection) between the RRC of the UE 100 and the RRC of the eNB 200, the UE 100 is in an RRC connected state. If there is not a connection (RRC connection) between the RRC of the UE 100 and the RRC of the eNB 200, the UE 100 is in an RRC idle state.

A non-access stratum (NAS) layer located above the RRC layer performs, for example, session management, mobility management, and the like.

Figure 3:
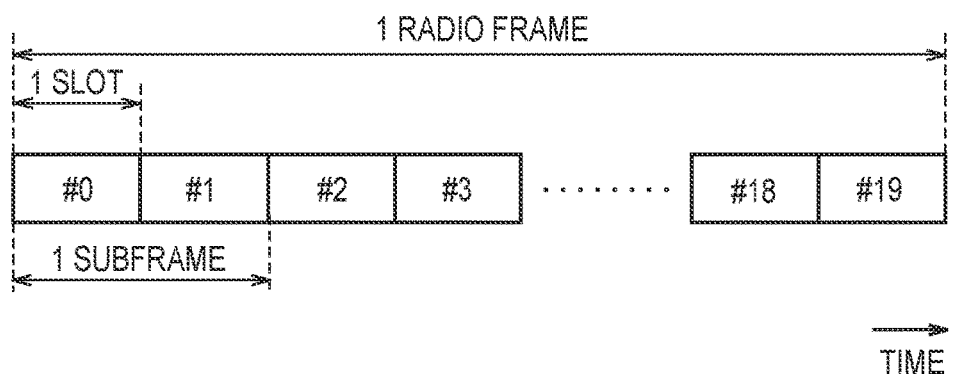
FIG. 3 is a configuration diagram of a radio frame used in the LTE system.

FIG. 3 is a configuration diagram of a radio frame used in the LTE system. In the LTE system, Orthogonal Frequency Division Multiple Access (OFDMA) is applied to downlink. In the LTE system, Single Carrier Frequency Division Multiple Access (SC-FDMA) is applied to uplink.

As illustrated in FIG. 3, a radio frame is constituted by ten subframes arranged in a time direction. Each subframe is constituted by two slots arranged in the time direction. The length of each subframe is 1 ms, and the length of each slot is 0.5 ms. Each subframe includes a plurality of resource blocks (RBs) in a frequency direction. Each subframe includes a plurality of symbols in the time direction. Each resource block includes a plurality of subcarriers in the frequency direction. One resource element (RE) is constituted by one symbol and one subcarrier. Radio resources (time/frequency resources) are allocated to the UE 100. In the frequency direction, radio resources (frequency resources) are constituted by resource blocks. In the time direction, radio resources (time resources) are constituted by subframes (or slots).

In the downlink, the section of the first several symbols of each subframe is an area that can be used as a physical downlink control channel (PDCCH) for transmitting a downlink control signal. The remaining part of each subframe is an area that can be used as a physical downlink shared channel (PDSCH) for transmitting downlink data.

In the uplink, both end portions in the frequency direction in each subframe are areas usable as a Physical Uplink Control Channel (PUCCH) for transmitting an uplink control signal. The remaining part of each subframe is an area that can be used as a physical uplink shared channel (PUSCH) for transmitting uplink data.

(Proximity-Based Service)

Proximity-based services (ProSes) will be described. The proximity-based service is a service that can be provided by a 3GPP system, based on communication devices (for example, UEs 100) in the vicinity of each other.

In the ProSe, various types of radio signals are transmitted and received via a direct radio link between nodes (for example, between UEs), without passing through the eNB 200. The direct radio link in ProSe is called "sidelink".

The sidelink may be an interface for sidelink communication and sidelink discovery (for example, an interface between a UE and a UE). The sidelink communication is a function (AS functionality) for enabling ProSe direct communication (hereinafter, appropriately referred to as "direct communication"). The sidelink discovery is a function (AS functionality) for enabling ProSe direct discovery (hereinafter, appropriately referred to as "direct discovery").

The sidelink corresponds to a PC5 interface. The PC5 is a reference point between ProSe usable UEs (ProSe-enabled UE) used for a control plane and a user plane for the ProSe direct discovery, the ProSe direct communication, and a ProSe UE-Network relay.

For modes of the ProSe, "direct discovery (Direct Discovery)", "direct communication (Direct Communication)", and "Relay" are defined. "Relay" will be described later.

The direct discovery is a mode of searching for a partner destination by directly transmitting, between the UEs, a discovery message (discovery signal) that does not specify a specific destination. The direct discovery is a procedure for discovering another UE in the vicinity of the UE by using a direct radio signal in E-UTRA (Evolved Universal Terrestrial Radio Access) via the PC5. Alternatively, the direct discovery is a procedure adopted by a UE 100 capable of executing the proximity-based service for discovering another UE 100 capable of executing the proximity-based service by using only a capability of the two UEs 100 with the help of the E-UTRA technology. The direct discovery is supported only if the service is provided to the UE 100 by the E-UTRAN (eNB 200 (cell)). The service can be provided by the E-UTRAN if the UE 100 is either connected to the cell (eNB 200) or located in the cell.

A resource allocation type for the transmission (announcement) of the discovery message (discovery signal) includes "Type 1" and "Type 2 (Type 2B)". In "Type 1", the UE 100 selects a radio resource. In Type 1, the UE 100 may select a radio resource from resource pools provided by the eNB 200. In "Type 2 (Type 2B)", the eNB 200 allocates a radio resource.

A "Sidelink Direct Discovery" protocol stack includes a physical (PHY) layer, a MAC layer, and the ProSe protocol. Between the physical layer of a UE (A) and the physical layer of a UE (B), a discovery signal is transmitted via a physical channel called a physical sidelink discovery channel (PSDCH). Between the MAC layer of the UE (A) and the MAC layer of the UE (B), a discovery signal is transmitted via a transport channel called a sidelink discovery channel (SL-DCH).

The direct communication is a mode in which data is directly transmitted between the UEs by specifying a specific destination (destination group). The direct communication is communication between two or more UEs capable of executing the proximity-based services through user plane transmission in which the E-UTRA technology is used via a path without passing through any network node.

A resource allocation type of the direct communication includes "Mode 1" and "Mode 2". In "Mode 1", the eNB 200 specifies a radio resource of the direct communication. In "Mode 2", the UE 100 selects a radio resource of the direct communication. In Mode 2, the UE 100 may select a radio resource from the resource pools provided by the eNB 200.

A direct communication protocol stack includes a physical (PHY) layer, a MAC layer, an RLC layer, and a PDCP layer. Between the physical layer of the UE (A) and the physical layer of the UE (B), a control signal is transmitted via a physical sidelink control channel (PSCCH), and data is transmitted via a physical sidelink shared channel (PSSCH). A synchronization signal and the like may be transmitted via a physical sidelink broadcast channel (PSBCH). Between the MAC layer of the UE (A) and the MAC layer of the UE (B), data is transmitted via a transport channel called a sidelink shared channel (SL-SCH). Between the RLC layer of the UE (A) and the RLC layer of the UE (B), data is transmitted via a logical channel called a sidelink traffic channel (STCH).

(Relay Using Proximity-Based Service)

Figure 4:
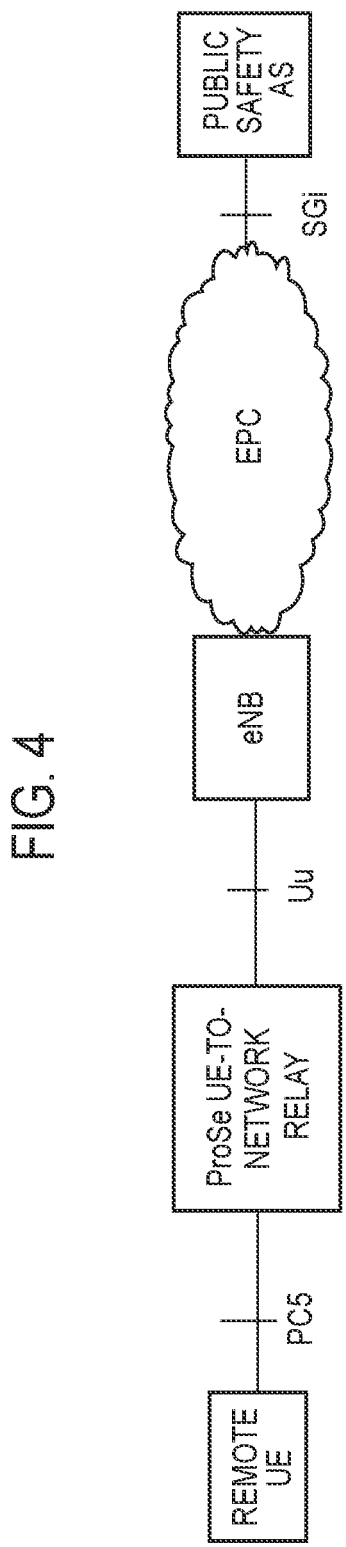
FIG. 4 is a diagram for describing a relay using a proximity-based service.

A relay using the proximity-based service (ProSe relay) will be described with reference to FIG. 4. FIG. 4 is a diagram for describing the relay using the proximity-based service according to the embodiment.

In FIG. 4, a remote UE (Remote UE) is a UE 100 that communicates with a PDN (Packet Data Network) via a relay UE (ProSe UE-to-Network Relay). The remote UE may be a UE for public safety (ProSe-enabled Public Safety UE).

The "ProSe-enabled Public Safety UE" is configured such that an HPLMN (Home Public Land Mobile Network) is authorised for use for public safety. The "ProSe-enabled Public Safety UE" can utilize the proximity-based services, and supports the procedures in the proximity-based services as well as a specific capability for public safety. For example, the "ProSe-enabled Public Safety UE" transmits information for public safety through the proximity-based services. The information for public safety includes, for example, information on a disaster (such as an earthquake and a fire) and information used by a fire official or a police official.

The remote UE may be a UE that is located outside the network area (Out-of-Network). That is, the remote UE may be located outside a coverage of the cell. The remote UE may be located within the coverage of the cell. Therefore, the remote UE may be a UE 100 to which a service is not directly provided by the E-UTRAN 10 (UE 100 which is not served by the E-UTRAN 10). The remote UE is provided with a ProSe relay service from the relay UE, as described later. A relay is executed between the remote UE that is provided with the ProSe relay service and the relay UE that provides the ProSe relay service.

The relay UE (ProSe UE-to Network Relay) provides functions to support connectivity of "Unicast" services for the remote UE. Therefore, the relay UE provides the ProSe relay service for the remote UE. Therefore, the relay UE can relay data (unicast traffic) between the remote UE and the network. The relay UE can relay data (traffic) of the remote UE through the proximity-based services (direct communication). Specifically, the relay UE can relay data (uplink traffic) received from the remote UE via the PC5 interface to the eNB 200 via a Uu interface (LTE-Uu) or a Un interface (LTE-Un). The relay UE can relay data (downlink traffic)

received from the eNB 200 via the Uu interface or the Un interface to the remote UE via the PC5 interface. The relay UE may be located only within the network (within the coverage of the cell).

The relay UE can provide a comprehensive function capable of relaying any type of traffic related to the communication for public safety.

The relay UE and the remote UE can transmit data and control signals between the physical layers. Similarly, the relay UE and the remote UE can transmit data and control signals between the MAC layers, between the RLC layers, and between the PDCP layers. In addition, the relay UE may have an IP-Relay layer as an upper layer of the PDCP layer. The remote UE may also have an IP layer as an upper layer of the PDCP layer. The relay UE and the remote UE can transmit data and control signals between the IP-Relay layer and the IP layer. It is possible for the relay UE to transmit data between the IP-Relay layer and the IP layer of a POW. The PGW (Packet Data Network Gateway) performs control to relay user data from an external network (and to an external network).

In an AS layer (Access Stratum), the relay UE can transmit data (traffic) to the remote UE by broadcast. In the AS layer, the relay UE may transmit data to the remote UE by unicast. If the ProSec relay service is executed by broadcast, a feedback in the NAS layer (Non Access Stratum) may be performed between the relay UE and the remote UE, but a feedback in the AS layer is not performed. If the UE-Network relay is executed by unicast, the feedback in the AS layer may be performed.

(Radio Terminal)

Figure 5:
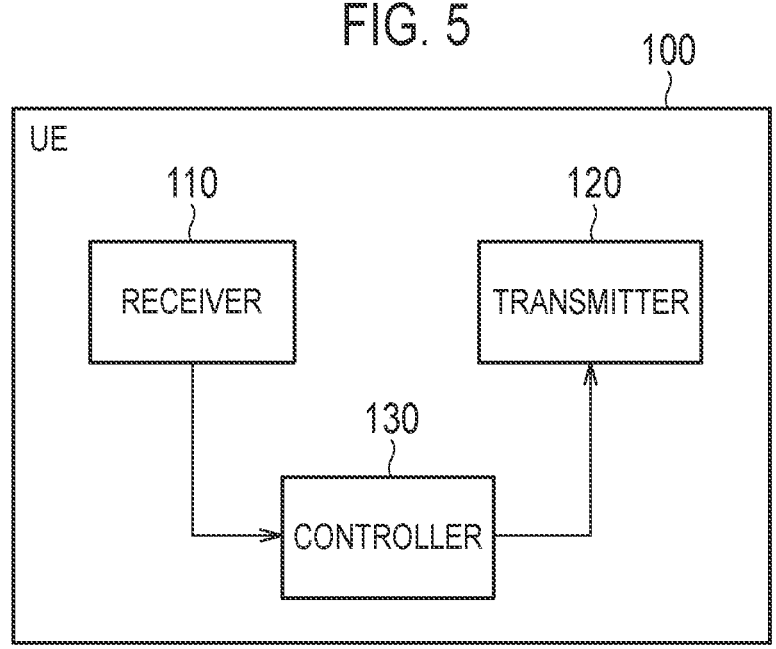
FIG. 5 is a block diagram of a UE 100.

The UE 100 (radio terminal) according to the embodiment will be described. FIG. 5 is a block diagram of the UE 100. As illustrated in FIG. 5, the UE 100 includes a receiver 110, a transmitter 120, and a controller 130. The receiver 110 and the transmitter 120 may be an integrated transceiver.

The receiver 110 performs various types of receptions under the control of the controller 130. The receiver 110 includes an antenna. The receiver 110 converts a radio signal received by the antenna into a baseband signal (reception signal). The receiver 110 outputs the baseband signal to the controller 130.

The transmitter 120 performs various types of transmissions under the control of the controller 130. The transmitter 120 includes an antenna. The transmitter 120 converts the baseband signal (transmission signal) output from the controller 130 into a radio signal. The transmitter 130 transmits the radio signal from the antenna.

The controller 130 performs various types of controls in the UE 100. The controller 130 includes a processor and a memory. The memory stores a program to be executed by the processor, and information to be used for a process by the processor. The processor includes a baseband processor and a CPU (Central Processing Unit). The baseband processor performs, for example, modulation and demodulation, and coding and decoding, of the baseband signal. The CPU executes a program stored in the memory to perform various types of processes. The processor may include a codec configured to perform encoding and decoding on sound and video signals. The processor executes various types of processes described later, and various types of communication protocols described above.

The UE 100 may include a GNSS (Global Navigation Satellite System) receiver unit. The GNSS receiver unit can receive a GNSS signal to obtain location information indicating a geographical location of the UE 100. The GNSS receiver unit outputs the GNSS signal to the controller 130.

The UE 100 may have a GPS (Global Positioning System) function for acquiring location information of the UE 100.

For simplicity, a process executed by at least any one of the receiver 110, the transmitter 120, and the controller 130 included in the UE 100 is described herein as a process (operation) executed by the UE 100.

(Base Station)

Figure 6:
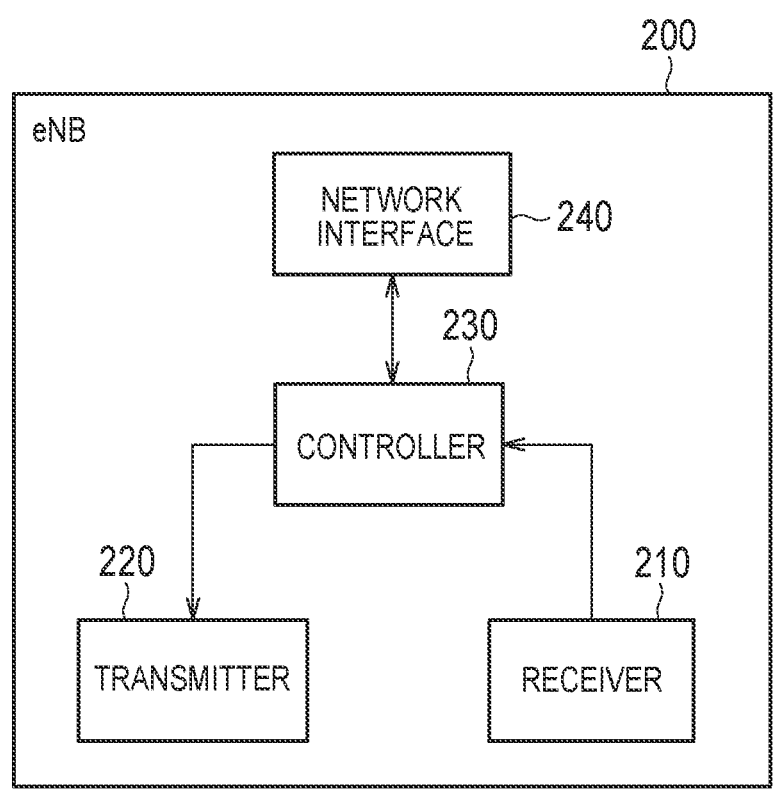
FIG. 6 is a block diagram of an eNB 200.

The eNB 200 (base station) according to the embodiment will be described. FIG. 6 is a block diagram of the eNB 200. As illustrated in FIG. 6, the eNB 200 includes a receiver 210, a transmitter 220, a controller 230, and a network interface 240. The receiver 210 and the transmitter 220 may be an integrated transceiver.

The receiver 210 performs various types of receptions under the control of the controller 230. The receiver 210 includes an antenna. The receiver 210 converts a radio signal received by the antenna into a baseband signal (reception signal). The receiver 210 outputs the baseband signal to the controller 230.

The transmitter 220 performs various types of transmissions under the control of the controller 230. The transmitter 220 includes an antenna. The transmitter 220 converts the baseband signal (transmission signal) output from the controller 230 into a radio signal. The transmitter 220 transmits the radio signal by the antenna.

The controller 230 performs various types of controls in the eNB 200. The controller 230 includes a processor and a memory. The memory stores a program to be executed by the processor, and information to be used for a process by the processor. The processor includes a baseband processor and a CPU. The baseband processor performs, for example, modulation and demodulation, coding and decoding, and the like, of the baseband signal. The CPU executes a program stored in the memory to perform various types of processes. The processor executes various types of processes described later, and various types of communication protocols described above.

The network interface 240 is connected to a neighbour eNB 200 via the X2 interface. The network interface 240 is connected to the MME 300 and the SGW 400 via the S1 interface. The network interface 240 is used in communication performed on the X2 interface and communication performed on the S1 interface, for example.

For simplicity, a process executed by at least any one of the transmitter 210, the receiver 220, the controller 230, and the network interface 240 included in the eNB 200 is described herein as a process (operation) executed by the eNB 200.

First Embodiment (1) Outline of Control Operation

Figure 7:
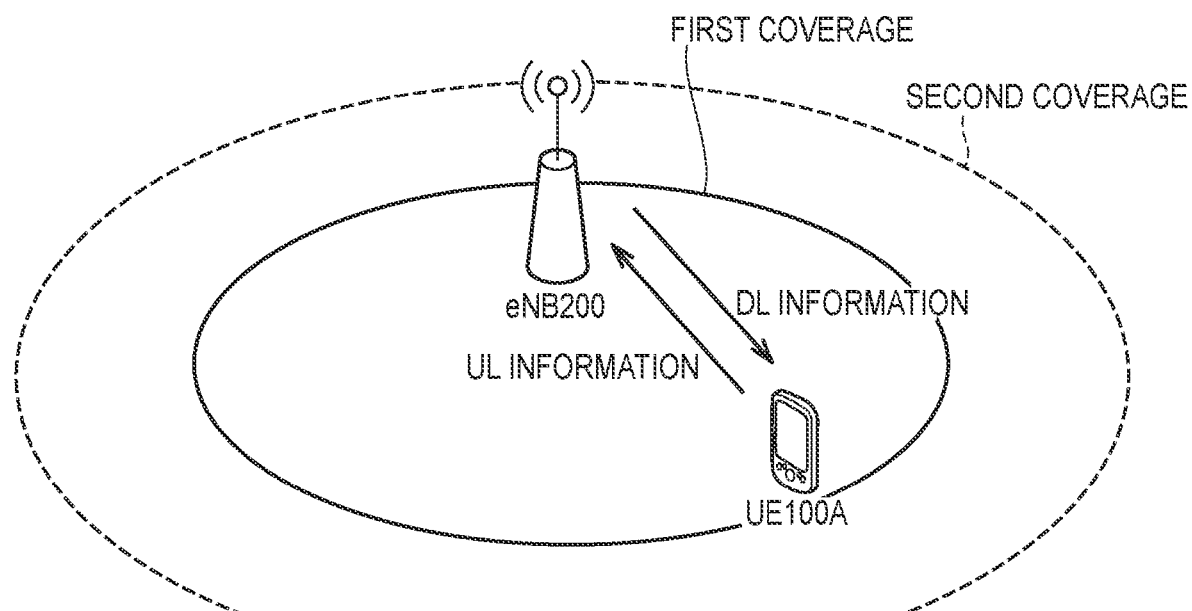
FIG. 7 is a diagram for describing an outline of a control operation (first control).
Figure 8:
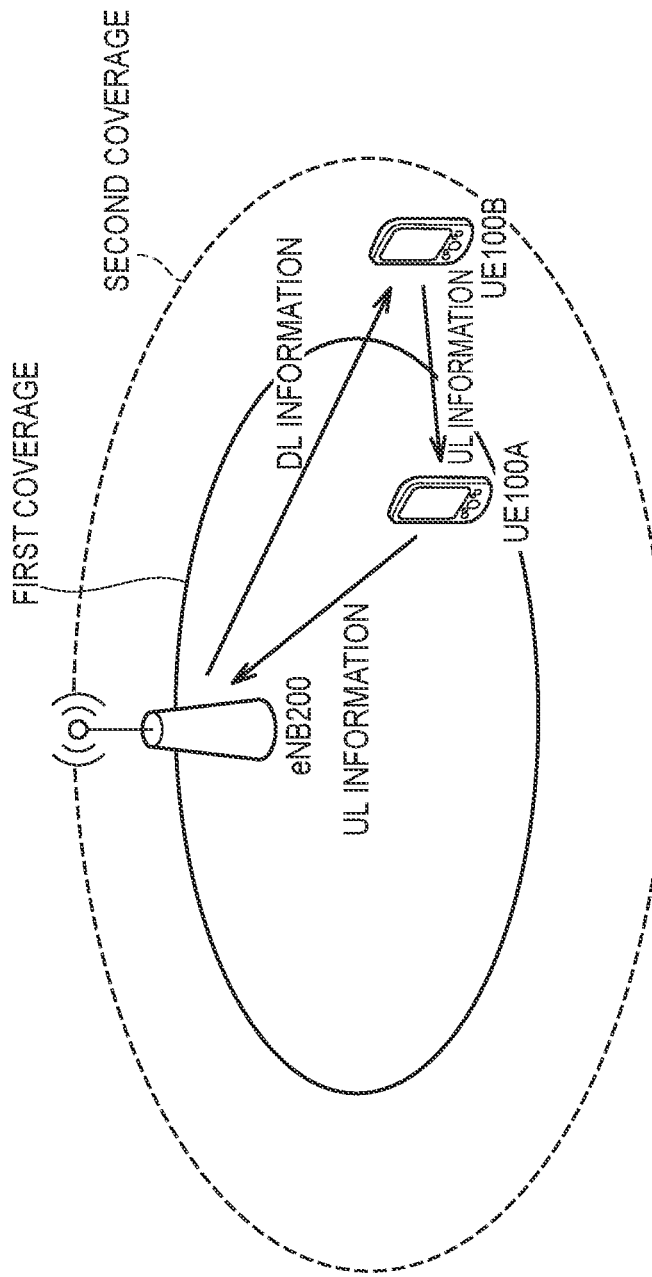
FIG. 8 is a diagram for describing an outline of a control operation (second control).
Figure 9:
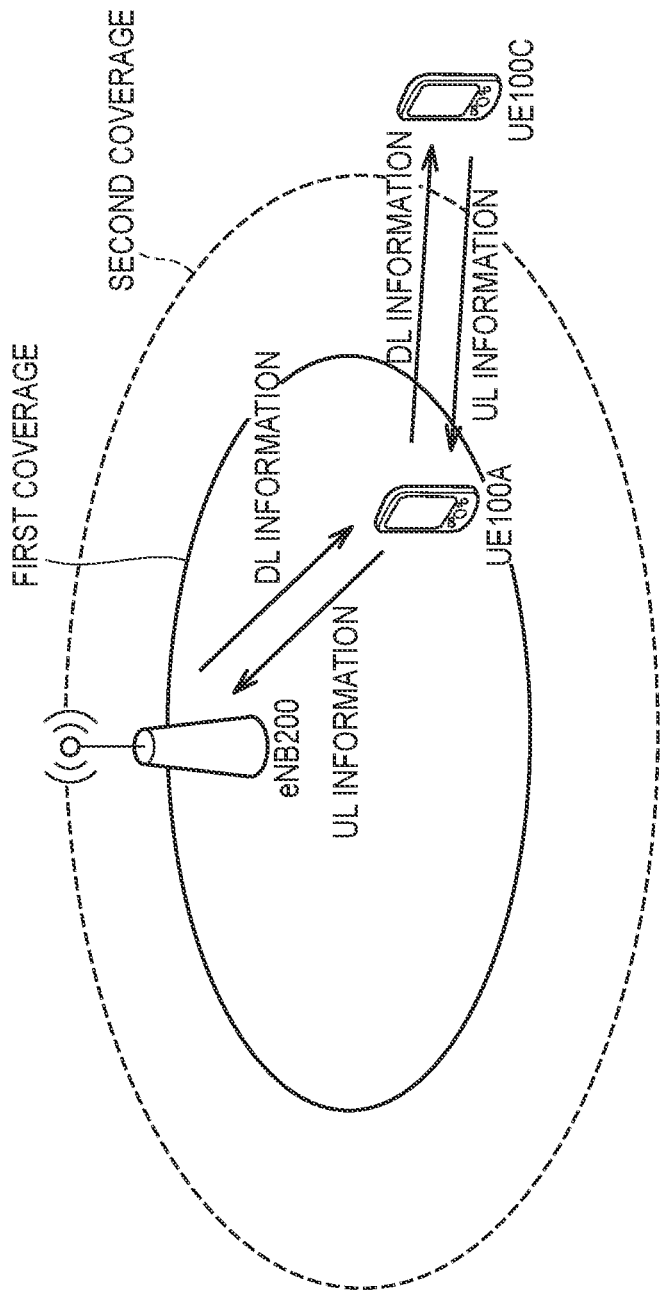
FIG. 9 is a diagram for describing an outline of a control operation (third control).

The outline of a control operation will be described with reference to FIG. 7 to FIG. 9. FIG. 7 to FIG. 9 are diagrams for describing the outline of the control operation.

(A) First Control

As illustrated in FIG. 7, in a first control, cellular communication is executed in the uplink and the downlink.

Specifically, in the first control, a UE 100A directly transmits uplink information to be transmitted to a cell (eNB 200) to the cell (eNB 200). That is, in the first control, the eNB 200 directly receives the uplink information from the UE 100A. Accordingly, the UE 100A executes uplink transmission. The eNB 200 executes uplink reception.

The uplink information is control information and/or user data from the eNB 200 to the UE 100A. The control information is carried through the PUCCH. The user data is carried through the PUSCH.

In the first control, the UE 100A directly receives downlink information to be received by the UE 100A from the cell (eNB 200). That is, in the first control, the eNB 200 directly transmits the downlink information to the UE 100A. Accordingly, the UE 100A executes downlink reception. The eNB 200 executes downlink transmission.

The downlink information is control information and/or user data from the UE 100A to the eNB 200. The control information is carried through the PDCCH. The user data is carried through the PDSCH.

(B) Second Control

As illustrated in FIG. 8, in a second control, a relay (ProSe relay) using the proximity-based service is executed in the uplink, and a cellular communication is executed in the downlink.

Specifically, in the second control, a UE 100B transmits the uplink information to the cell via the UE 100A. That is, in the second control, the eNB 200 receives the uplink information from the UE 100B via the UE 100A. Specifically, the UE 100B transmits the uplink information to the UE 100A. Accordingly, the UE 100B executes sidelink transmission. The UE 100A executes sidelink reception. The UE 100A directly transmits the uplink information received from the UE 100B to the eNB 200. Accordingly, the UE 100A executes uplink transmission. The eNB 200 executes uplink reception. The UE 100 A is a relay UE (ProSe UE-to-Network relay).

The uplink information is carried between the UE 100A and the eNB 200 in the same manner as the first control described above. On the other hand, between the UE 100A and the UE 100B, the control information in the uplink information may be carried through the PSCCH. The control information may be carried through the PSSCH. The user data in the uplink information may be carried through the PSSCH.

In the second control, the UE 100B directly receives the downlink information from the cell (eNB 200). That is, in the second control, the eNB 200 directly transmits the downlink information to the UE 100B. Reception (transmission) of the downlink information is executed in the same manner as the first control.

The downlink information is carried in the same manner as the first control described above.

In the second control, the UE 100B may transmit the uplink information based on information of a transmission power applied for execution of the second control. The information of the transmission power may be parameters such that a transmission power value in the second control is lower than a transmission power value in the first control. The information of the transmission power may be parameters such that the transmission power value in the second control is lower than a transmission power value in a third control.

The eNB 200 can transmit the information of the transmission power to the UE 100B. The UE 100B can receive the information of the transmission power from the eNB 200 (cell). The information of the transmission power may be included in information of a determination criterion described later.

(C) Third Control

As illustrated in FIG. 9, in a third control, a ProSe relay is executed in the uplink and the downlink.

Specifically, in the third control, a UE 100C transmits the uplink information to the cell via the UE 100A. That is, in the third control, the eNB 200 receives the uplink information from the UE 100C via the UE 100A. Transmission (reception) of the uplink information is executed in the same manner as the second control.

In the third control, the UE 100C receives the downlink information from the cell via the UE 100A. That is, in the third control, the eNB 200 transmits the downlink information to the UE 100C via the UE 100A. Specifically, the eNB 200 transmits the downlink information to the UE 100A. Accordingly, the eNB 200 executes downlink transmission. The UE 100A executes downlink reception. The UE 100A transmits the downlink information received from the eNB 200 to the UE 100C. Accordingly, the UE 100A executes sidelink transmission. The UE 100C executes sidelink reception.

The downlink information is carried between the UE 100A and the eNB 200 in the same manner as the first control described above. On the other hand, between the UE 100A and the UE 100C, the control information in the uplink information may be carried through the PSCCH. The control information may be carried through the PSSCH. The user data in the downlink information may be carried through the PSSCH.

(2) Determination Operation

Figure 10:
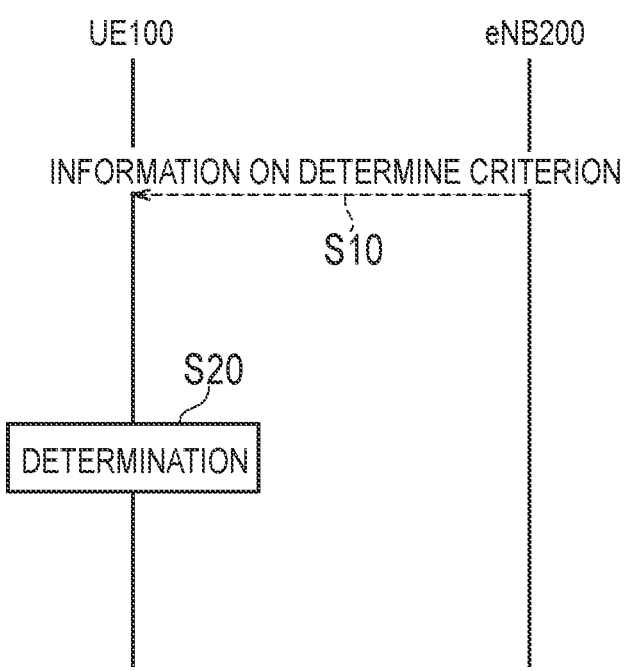
FIG. 10 is a sequence chart for describing a determination operation according to a first embodiment.

A determination operation will be described with reference to FIG. 10. FIG. 10 is a sequence chart for describing the determination operation according to the first embodiment.

In the first embodiment, the UE 100 executes any one of the first control, the second control, and the third control, based on at least one of a reception level of a radio signal from the cell (eNB 200) and a transmission level of the UE 100.

The reception level is based on a measurement result (measurement value) measured by the UE 100 with respect to the radio signal from the cell (eNB 200). The reception level may be a value (for example, "RS-SINR" described later) calculated from the measurement value.

The transmission level may be, for example, a maximum power (value) defined based on parameters set in the UE 100. For example, the transmission level may be the maximum RF output power based on the UE power class. The transmission level may be a minimum power (value) defined based on parameters set in the UE 100. The transmission level may be a transmission power (value) to be actually transmitted calculated based on parameters set in the UE 100.

As illustrated in FIG. 10, in step S10, the eNB 200 may transmit information of a determination criterion to the UE 100. The eNB 200 may individually notify the UE 100 of the information of the determination criterion by unicast (for example, an RRC reconnection configuration message). For example, the eNB 200 may notify the UE 100A of the information of the determination criterion by broadcast (for example, an SIB: System Information Block).

The information of the determination criterion may include parameters related to a first determination criterion ((a set of) first threshold value parameters). The first determination criterion is used for determining an area in which the first control can be executed. The first determination criterion is defined by at least one of a reception level of a radio signal (DL signal) from the cell (eNB 200) and a transmission level of the UE 100.

The UE 100 measures the reception level of the radio signal from the cell (eNB 200). The UE 100 can determine whether or not the measurement result (reception level) satisfies the first determination criterion. The UE 100 can determine whether or not a transmission power value (transmission level) of the UE 100 satisfies the first determination criterion. The UE 100 can determine whether or not the reception level and the transmission level satisfy the first determination criterion.

The first determination criterion may be, for example, a criterion related to a reception power (RSRP: Reference Signal Received Power) of the DL signal. The first determination criterion may be a criterion related to a reception quality (RSRQ: Reference Signal Received Quality) of the DL signal. The first determination criterion may be an RS-SINR (Reference Signal Signal Interference Noise Ratio) based on the DL signal. The RS-SINR is a ratio of a reference signal to an interference signal (interference noise): (reference signal)/(interference signal).

The first determination criterion may be, for example, a criterion related to a transmission power in the uplink. The first determination criterion may be, for example, a criterion related to a transmission power in the sidelink.

The first determination criterion may be defined by both the reception level and the transmission level. For example, the first determination criterion may be an S-criterion (S-criteria) for determining a coverage area of the cell.

The information of the determination criterion may include parameters related to a second determination criterion ((a set of) second threshold value parameters). The second determination criterion is used for determining an area in which the second control can be executed. The second determination criterion is defined by at least one of the reception level of the DL signal and the transmission level of the UE 100. The UE 100 determines whether or not the measurement result (reception level) satisfies the second determination criterion. The second criterion is a criterion different from the S criterion.

The second threshold value parameters may be the same type of parameters as the first threshold value parameters. The second threshold value parameters may be a different type of parameters from the first threshold value parameters.

The UE 100 may hold the information of the determination criterion in advance.

In step S20, the UE 100 determines which one of the first control, the second control, and the third control is to be executed. The UE 100 performs the determination, for example, by the following method.

A first method is that the UE 100 performs the determination based on the information of the determination criterion.

For example, when the first determination criterion is satisfied, the UE 100 determines that the first control can be executed. Accordingly, when the UE 100 is located within a first coverage based on the first determination criterion, the UE 100 determines that the first control can be executed (see FIG. 7). When the UE 100 is located outside the first coverage based on the first determination criterion, the UE 100 determines that the first control cannot be executed.

For example, when the reception level (RSRP) of the DL signal is greater than or equal to the first threshold value, the UE 100 determines that the first control can be executed. When the RSRP of the DL signal is less than the first threshold value, the UE 100 determines that the first control cannot be executed.

For example, when the transmission power (uplink transmission power) in the uplink is greater than or equal to the first threshold value, the UE 100 may determine that the first control cannot be executed. When the uplink transmission power is less than the first threshold value, the UE 100 may determine that the first control can be executed.

For example, when the second determination criterion is satisfied, the UE 100 determines that the second control can be executed. Accordingly, when the UE 100 is located within a second coverage based on the second determination criterion, the UE 100 determines that the second control can be executed (see FIG. 8). When the UE 100 is located outside the second coverage based on the second determination criterion, the UE 100 determines that the second control cannot be executed.

For example, when the RSRP of the DL signal is greater than or equal to the second threshold value, the UE 100 determines that the second control can be executed. When the RSRP of the DL signal is less than the second threshold value, the UE 100 determines that the second control cannot be executed.

For example, when the uplink transmission power is greater than or equal to the second threshold value, the UE 100 may determine that the second control can be executed. When the uplink transmission power is less than the second threshold value, the UE 100 may determine that the second control cannot be executed.

For example, when the transmission power (SL transmission power) in the sidelink is greater than or equal to the second threshold value, the UE 100 may determine that the second control cannot be executed. When the SL transmission power is less than the second threshold value, the UE 100 may determine that the second control can be executed.

As illustrated in FIG. 8, the second threshold value parameters may be set such that the second coverage is wider than the first coverage. Therefore, the second threshold value may be a value lower (or higher) than the first threshold value.

When the second determination criterion is satisfied and the first determination criterion is not satisfied, the UE 100 may determine that the second control is to be executed. Therefore, even when the second determination criterion is satisfied, the UE 100 may determine that the first control is to be executed if the first determination criterion is satisfied.

Here, when the S-criterion is not satisfied, the UE 100 is located outside the coverage of the cell (so-called out-of-coverage). However, in this case, when the second determination criterion is satisfied and there is a relay UE near the UE 100, the UE 100 may determine that the UE 100 is located within a relay-extended in-coverage. When the UE 100 is within the relay-extended in-coverage, the UE 100 may determine that the second control is to be executed. Even when the second determination criterion is satisfied, the UE 100 may determine that the UE 100 is located outside the coverage of the cell if there is no relay UE near the UE 100. In this case, the UE 100 determines that the third control is to be executed.

Only when receiving information of the second determination criterion (second threshold value parameters) from the cell (eNB 200), the UE 100 may determine that the second control can be executed. That is, the information of the second determination criterion may be information indicating permission of the eNB 200. Alternatively, the eNB 200 may transmit, to the UE 100, permission information explicitly indicating that it is permitted to execute the second control. In response to receiving the permission information, the UE 100 may determine that execution of the second control is permitted by the eNB 200.

When the first determination criterion and the second determination criterion are not satisfied, the UE 100 may determine that the third control is to be executed.

A second method is that the UE 100 determines that the second control is to be executed when directly receiving information of radio resources used for the ProSe relay from the cell (eNB 200).

For example, when successfully receiving an SIB (for example, SIB 18 and/or SIB 19) including the information of radio resources, the UE 100 determines that the second control is to be executed. When the S-criterion is not satisfied and the SIB is successfully received, the UE 100 may determine that the second control is to be executed.

By the first method and/or the second method, the UE 100 can execute an executable control among the first control, the second control, and the third control. As described later, the UE 100A may execute the second control in preference to the first control.

(3) Operation after Determination (A) First Control

When the UE 100 determines that the first control is to be executed, the UE 100 can execute an operation for establishing a connection with the eNB 200 (cell). That is, the UE 100 may establish an uplink bearer (UL bearer) and a downlink bearer (DL bearer) with the eNB 200. After that, the UE 100 can execute the first control.

If the UE 100 does not transmit the uplink information to the eNB 200, the UE 100 does not have to establish an RRC connection. The UE 100 in an RRC idle state may receive the downlink information from the eNB 200 (cell).

(B) Second Control

When the UE 100B determines that the second control is to be executed, the UE 100B can start an operation for searching for a relay UE. The UE 100B may start that operation when it is necessary to transmit the uplink information to the eNB 200. For example, when transmission data occurs (for example, when transmission data is received from an upper layer), the UE 100B may start that operation. When it is necessary to receive the downlink information from the eNB 200, the UE 100B may start that operation. For example, when receiving a paging message from the base station, the UE 100B may start that operation.

When the UE 100B determines that the second control is to be executed, the UE 100B can execute one of the following operation patterns before starting the second control.

(B1) Operation Pattern 1

Figure 11:
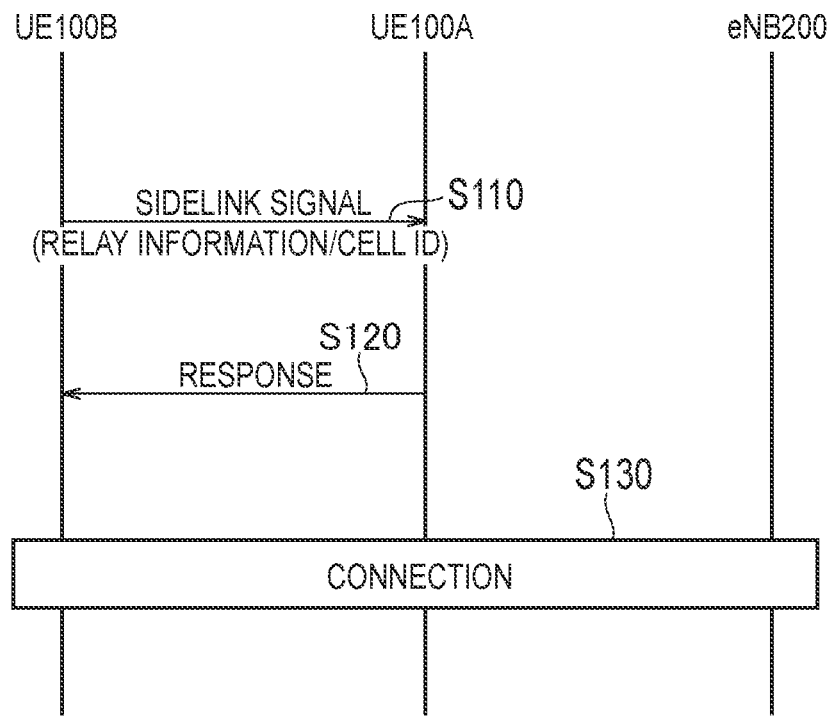
FIG. 11 is a sequence chart for describing operation pattern 1.

Operation pattern 1 will be described with reference to FIG. 11 (and FIG. 8). FIG. 11 is a sequence chart for describing operation pattern 1.

As illustrated in FIG. 11, in step S110, the UE 100B transmits a sidelink signal. The sidelink signal may be a discovery signal or a communication signal. The discovery signal may be a signal (solicitation signal) that requires a response or a signal that does not require a response.

The sidelink signal may include relay information for notifying the relay UE that the UE 100B desires a relay of only the uplink information. The relay information may be information indicating that the relay is for only one direction (Uni-direction: UL transmission). The relay information may be information indicating whether or not to desire a relay for both the uplink and the downlink. When the relay information indicates that a relay for both the uplink and the downlink is not desired, the UE 100A may determine that the UE 100B desires a relay of only the uplink information.

The sidelink signal may include an identifier of a cell that is a transmission source of the downlink information. The identifier of the cell may be information for specifying a donor eNB (cell). For example, the UE 100B may include, in the sidelink signal, an identifier of a cell that is a transmission source of a radio signal that satisfies the second determination criterion.

The identifier of the cell may be an identifier of a cell that is a transmission source of a control signal (for example, an SIB). Therefore, the identifier of the cell may be an identifier of a cell that permits (sets) transmission and reception of the sidelink signal. When the UE 100 has already established a connection with the cell (eNB 200) (that is, it is in the RRC connected state), the identifier of the cell may be an identifier of the cell that is the connection destination.

The UE 100A receives the sidelink signal. The UE 100A may grasp that the UE 100B desires a relay of only the uplink information, based on the relay information included in the sidelink signal.

The UE 100A may determine whether or not the identifier of the cell included in the sidelink signal indicates a serving cell in which the UE 100A is located. The serving cell is a cell to which the UE 100A is connected or a cell in which the UE 100A camps.

If the identifier of the cell indicates a serving cell, the UE 100A may determine that a ProSe relay can be executed. If the identifier of the cell does not indicate a serving cell, the UE 100A may determine that a ProSe relay cannot be executed.

If the identifier of the cell does not indicate a serving cell, the UE 100A may start an operation for connecting with the cell indicated by the identifier of the cell. The UE 100A may request the eNB for a handover to connect with the cell indicated by the identifier of the cell. When the handover is successful, the UE 100A may determine that a ProSe relay can be executed. That is, when establishing a Uu connection with the cell indicated by the identifier of the cell, the UE 100A may determine that a ProSe relay can be executed.

If the identifier of the cell does not indicate a serving cell, the UE 100A may start a cell search. The UE 100A may discover (select) the cell indicated by the identifier of the cell based on the cell search. When discovering the cell, the UE 100A may determine that a ProSe relaying can be executed.

In step S120, the UE 100A transmits a response (sidelink signal) to the sidelink signal. The UE 100B receives the response to the sidelink signal.

When a ProSe relay can be executed, the UE 100A may transmit the response. When a ProSe relay cannot be executed, the UE 100A may transmit a response indicating rejection.

In step S130, the UE 100A, the UE 100B, and the eNB 200 establish an RRC connection.

The UE 100A and the UE 100B establish a connection for one-to-one communication. The UE 100A may start a connection for a ProSe relay with the eNB 200.

Here, a bearer (UL bearer) for transmitting the uplink information to the eNB 200 may be established. The UL bearer is a bearer via the UE 100A. The UL bearer may be a different bearer from a bearer (DL bearer) for receiving the downlink information from the eNB 200.

The UL bearer and the DL bearer may be sub-bearers. The UL bearer and the DL bearer may be mapped to radio bearers between the UE 100B and the eNB 200. The UL bearer and the DL bearer may be mapped to EPS bearers between the UE 100B and a PGW ((Packet Data Network Gateway)).

After that, the UE 100B can execute the second control.

As described above, the UE 100B can match the cell (eNB 200) of the transmission destination of the uplink information with the cell (eNB 200) of the transmission source of the downlink information. Thus, the second operation can be executed without complicated control.

(B2) Operation Pattern 2

Figure 12:
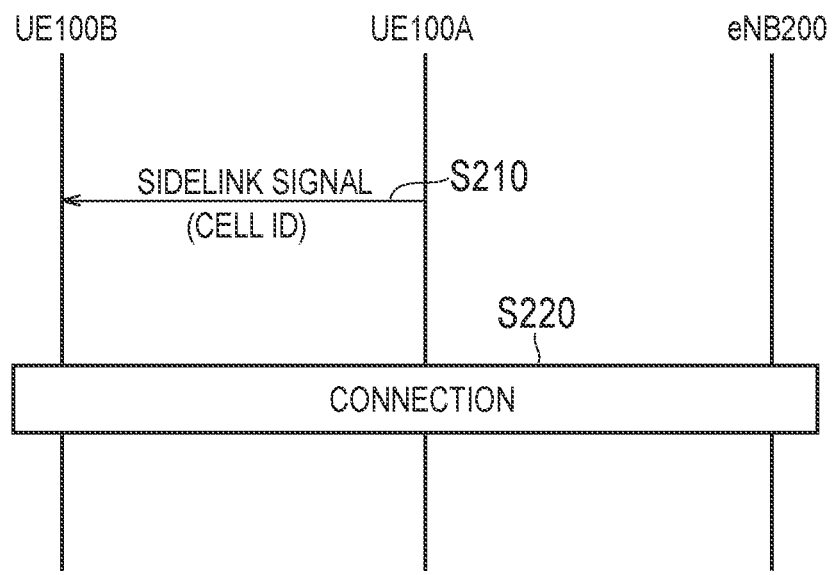
FIG. 12 is a sequence chart for describing operation pattern 2.

Operation pattern 2 will be described with reference to FIG. 12 (and FIG. 8). FIG. 12 is a sequence chart for describing operation pattern 2.

As illustrated in FIG. 12, in step S210, the UE 100A transmits a sidelink signal. The sidelink signal is a discovery signal for discovering a remote UE.

The sidelink signal may include an identifier of a cell in which the UE 100A that is a transmission source of the sidelink signal is located. The identifier of the cell may be information for specifying a donor eNB (cell).

The UE 100B receives the sidelink signal. In response to receiving the sidelink signal, the UE 100B may start the process of step S220.

If the identifier of the cell indicates a cell (predetermined cell) that is a transmission source of the downlink information, the UE 100B may determine that the second control can be executed. If the identifier of the cell does not indicate the predetermined cell, the UE 100B may determine that the second control cannot be executed.

When the identifier of the cell does not indicate the predetermined cell, the UE 100B may execute an operation for receiving the downlink information from the serving cell of the UE 100A indicated by the identifier of the cell. That is, the UE 100B may switch the internal process to receive the downlink information from the serving cell indicated by the identifier of the cell. Accordingly, the UE 100B may start a cell search for discovering the serving cell indicated by the identifier of the cell. When discovering the serving cell, the UE 100B may determine that the second control can be executed. When the reception level of a radio signal from the discovered serving cell is greater than or equal to a threshold value (for example, when the second determination criterion is satisfied), the UE 100B may determine that the second control can be executed.

When the second control can be executed, the UE 100B may start the process of step S220.

When the second control cannot be executed, the UE 100B may execute reception (or transmission) of the sidelink signal to discover a new relay UE located in the predetermined cell. Alternatively, the UE 100B may establish a connection (a connection for one-to-one communication) for executing an existing ProSe relay with the UE 100A in order to execute the third control.

Step S220 corresponds to step S130.

(C) Third Control

When the UE 100C determines that the third control is to be executed, the UE 100C can start an operation for searching for a relay UE in the same manner as the second control.

The UE 100C does not need to include the relay information in the sidelink signal. The UE 100C does not need to include the identifier of the cell in the sidelink signal.

As illustrated in FIG. 9, the UE 100C that has discovered the UE 100A as a relay UE establishes a connection for one-to-one communication with the UE 100A. The UE 100A starts a connection for ProSe relay with the eNB 200. After that, the UE 100C can execute the third control.

As described above, the UE 100B can execute any one of the first control, the second control, and the third control, based on at least one of a reception level of a radio signal from the cell and a transmission level of the radio terminal. For example, even when the S-criterion is not satisfied, the UE 100B can execute the second control if the downlink information can be directly received from the eNB 200. Therefore, it is possible to extend the network coverage (i.e., to reduce the coverage hole).

When the second control is executed, the UE 100A needs to relay only the uplink information, so that the load of the relay process of the UE 100A can be reduced. Even when the first control cannot be executed, the UE 100B can reduce the load of the relay process of the UE 100A by executing the second control instead of the third control.

Second Embodiment

Figure 13:
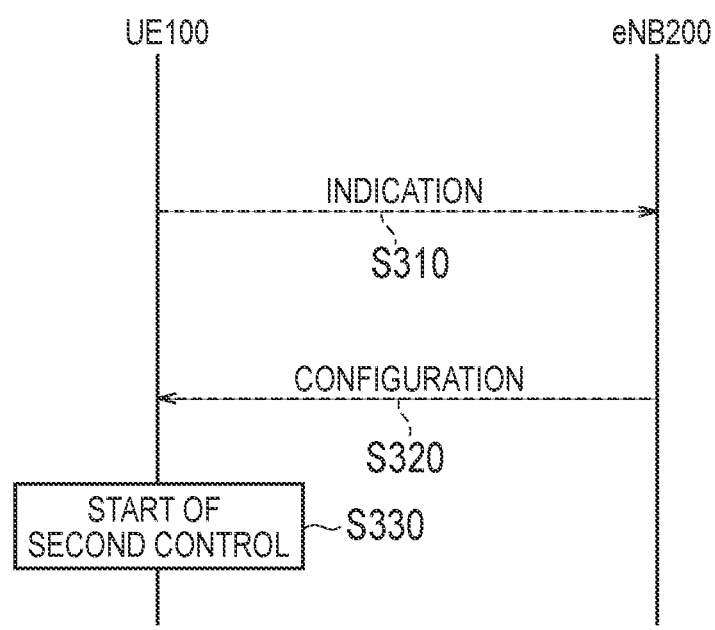
FIG. 13 is a sequence chart for describing an operation according to a second embodiment.

A second embodiment will be described with reference to FIG. 13. FIG. 13 is a sequence chart for describing an operation according to the second embodiment.

As illustrated in FIG. 13, in step S310, the UE 100 can transmit, to the eNB 200, a notice (indication) indicating that the UE 100 prefers the second control. The notice may be transmitted to the eNB 200 via a network device (for example, the MME 300). For example, when attached to the network, the UE 100 can transmit the notice to the network device.

When executing a power saving mode for reducing power consumption, the UE 100 may transmit a notice to the eNB 200. When the remaining battery level of the UE 100 falls below a threshold value, the UE 100 may transmit a notice to the eNB 200.

The notice may be information indicating that the UE 100 prefers reduced power consumption. For example, the notice may be information indicating that the UE 100 is a communication device for machine type communication (MTC: Machine Type Communication) that is communication without human intervention. The notice may be information indicating that the UE 100 is a wearable UE (a user-wearable communication device). The notice may be information for requesting permission of the second control. The notice may be information indicating that the second control is to be executed (or is being executed).

In step S320, the eNB 200 may transmit setting information for executing the second control to the UE 100. In response to the notice from the UE 100, the eNB 200 may transmit the setting information to the UE 100.

The setting information may include information indicating that execution of the second control is permitted. The setting information may include the information of the determination criterion (second determination criterion) for determining whether or not the second control can be executed. The setting information may include control information for executing the second control in preference to the first control.

In step S330, the UE 100 starts the second control.

The UE 100 may start the second control based on the setting information from the eNB 200. When the determination criterion (second determination criterion) is satisfied, the UE 100 may execute the second control.

The UE 100 may execute the second control without receiving the setting information from the eNB 200. In this case, the UE 100 can transmit, to the eNB 200, information indicating that the second control is to be executed (or is being executed).

The UE 100 may execute the second control in preference to the first control. For example, when executing the power saving mode, the UE 100 may execute the second control in preference to the first control. When the remaining battery level of the UE 100 falls below a threshold value, the UE 100 may execute the second control in preference to the first control.

The UE 100 may execute the second control in preference to the first control based on the setting information. For example, if the setting information includes a threshold value to be compared with the remaining battery level, the UE 100 may execute the second control in preference to the first control when the remaining battery level falls below the threshold value.

By executing the second control in preference to the first control, the UE 100 can reduce the transmission power of the uplink information, so that the power consumption can be reduced.

Other Embodiments

The contents of the present application are described according to each of the above-described embodiments, but it should not be understood that the discussion and the drawings constituting a part of this disclosure limit the contents of the present application. From this disclosure, various alternative embodiments, examples, and operational technologies will become apparent to those skilled in the art.

In the above description, the UE 100 may determine the executable control as follows.

For example, the UE 100 may determine the control to be prioritized based on the S-criterion. For example, if the S-criterion in a normal coverage is not satisfied and the-S criterion in an enhanced coverage is satisfied, the UE 100 may execute the second control. That is, when the UE 100 is not located within the normal coverage but is located within the enhanced coverage, the UE 100 may prioritize the second control over the first control. Alternatively, if the S-criterion in the normal coverage is not satisfied and the S-criterion in the enhanced coverage is satisfied, the UE 100 may prioritize the third control over the first control and the second control.

The UE 100 may use the second determination criterion obtained by setting a compensation term (Pcompensation) of the transmission level used in the S-criterion to 0.

If the following Equation (1) is satisfied, the S-criterion is satisfied.

$$Srxlev > 0 \text{ AND } Squal > 0 \qquad \text{equation (1)}$$

Srxlev and Squal are calculated by the following equations.

$$Srxlev = Qrxlevmeas - (Qrxlevmin + Qrxlevminoffset) - Pcompensation - Qoffsettemp$$

$$Squal = Qqualmeas - (Qqualmin + Qqualminoffset) - Qoffsettemp$$

TABLE 1

| | |
|---|---|
| Srxlev | Cell selection RX level value (dB) |
| Squal | Cell selection quality value (dB) |
| Qoffset$_{temp}$ | Offset temporarily applied to cell (dB) |
| Q$_{rxlevmeas}$ | Measured cell RX level value (RSRP) |
| Q$_{qualmeas}$ | Measured cell quality value (RSRQ) |
| Q$_{rxlevmin}$ | Minimum required RX level in the cell (dBm) |
| Q$_{qualmin}$ | Minimum required quality level in the cell (dB) |
| Q$_{rxlevminoffset}$ | Offset to notified Q$_{rxlevmin}$ in which Srxlev evaluation was considered as a result of periodic search of higher priority PLMN while camping on standard within Visited Public Land Mobile Network (VPLMN), the Srxlev evaluation was considered |
| Q$_{qualminoffset}$ | Offset to notified Q$_{qualmin}$ in which Srxlev evaluation was considered as a result of periodic search of higher priority PLMN while camping on standard within Visited Public Land Mobile Network (VPLMN), the Srxlev evaluation was considered |

TABLE 1-continued

| | |
|---|---|
| Pcompensation | If UE supports additionalPmax inside NS-PmaxList and is present in SIB 1, SIB 3 and SIB 5, max (PEMAX 1 − PPowerClass, 0) − (min (PEMAX 2, PPowerClass) − min (PEMAX 1, PPowerClass)) (dB); Otherwise: max(P$_{EMAX1}$ − P$_{PowerClass}$, 0) (dB); |
| P$_{EMAX}$, P$_{EMAX 2}$ | Maximum TX power level (dBm) that UE may use when transmitting over uplink in cell defined as PEMAX. P$_{EMAX 1}$ and P$_{EMAX 2}$ are obtained from p-Maxand NS-PmaxListin SIB 1, SIB 3 and SIB 5, respectively. |
| P$_{PowerClass}$ | Maximum RF output power (dBm) of UE that complies with UE power class |

In order to determine whether or not the S-criterion in the enhanced coverage is satisfied, the UE 100 uses specific $Q_{rxlevmin}(Q_{rxlevmin\_CE})$ as $Q_{rxlevmin}$, and uses specific $Q_{qualmin}(Q_{qualmin\_CE})$ as $Q_{qualmin}$.

The enhanced coverage is a coverage defined for UEs for UE/NB-IoT (Narrow Band Internet of Things) for MTC. Parameters are set such that the enhanced coverage is wider than the normal coverage.

The determination criterion may be a criterion for detecting a radio link failure. For example, the UE 100 may determine which of the controls can be executed by using at least one of a determination value of out-of-synchronization time/count, a determination value of random access failure time/count, and a determination value of RLC retransmission failure count.

For example, when the criteria for detecting a radio link failure is not satisfied, the UE 100 may determine that the first control is to be executed. When the criterion for detecting a radio link failure is satisfied, the UE 100 may determine that the third control is to be executed. When the criterion for detecting a radio link failure (for example, at least one of the determination value of the random access failure time/count and the determination value of the RLC retransmission failure count) and the UE 100 is located within the second coverage based on the second determination criterion, the UE 100 may determine that the second control is to be executed.

In the above description, in the second control, the eNB 200 may transmit only the control information as the downlink information. Accordingly, in the second control, the eNB 200 directly transmits only the control information to the UE 100B. The UE 100B may directly receive only the control information from the eNB 200 (cell). On the other hand, in the second control, the eNB 200 may transmit the user data to the UE 100B via the UE 100A. The UE 100B may receive the user data from the cell via the UE 100A.

The operation according to each of the above-described embodiments may be combined to be executed, where appropriate. In each of the above-described sequences, all of the operations may not necessarily be an essential configuration. For example, in each sequence, only some of the operations may be executed.

Although not particularly mentioned in each of the above-described embodiments, a program for causing a computer to execute each process performed by any one of the above-described nodes (such as the UE 100 and the eNB 200) may be provided. The program may be recorded on a computer-readable medium. If the computer-readable medium is used, it is possible to install the program in a computer. Here, the computer-readable medium recording therein the program may be a non-transitory recording medium. The non-transitory recording medium may include, but not be limited to, a recording medium such as a CD-ROM and a DVD-ROM, for example.

A chip may be provided which is configured by: a memory for storing a program for performing each process performed by any one of the UE 100 and the eNB 200; and a processor) for executing the program stored in the memory.

In the above-described embodiments, an LTE system is described as an example of the mobile communication system; however, the LTE system is not an exclusive example, and the content according to the present application may be applied to a system other than the LTE system.

[Supplementary Note]

In this supplementary note, the coverage scenario is further discussed, focusing on the remote UEs.

(1) Discussion

The UE may consider "in-coverage" for Uu when the S-criteria are fulfilled (See the above equation (1) and Table 1).

If cell selection criterion S in normal coverage is not fulfilled for a cell, UE shall consider itself to be in enhanced coverage if the cell selection criterion S for enhanced coverage is fulfilled, where: the UE applies coverage specific value $Q_{rxlevmin\_CE}$ (dBm) as $Q_{rxlevmin}$. The UE applies coverage specific value $Q_{qualmin\_CE}$ (dB) as $Q_{qualmin}$.

For the UE in enhanced coverage, coverage specific values $Q_{rxlevmin\_CE}$ and $Q_{qualmin\_CE}$ are only applied for the suitability check in enhanced coverage (i.e. not used for measurement and reselection thresholds).

As the Pcompensation and $P_{PowerClass}$ described above, for evaluation of RSRP, Srxlev is specified as the function of PPowerClass.

Observation 1: The evaluation of "in-coverage" is affected by the UE power class.

For other categories, e.g., for a normal UE, are typically 23 dBm, i.e., Class 3, a new UE power class, i.e., Class 5, where 20 dBm is allowed as the maximum output power has been defined. So, the normal coverage may be different in 3 dB between Class 3 UEs and Class 5 UEs, wherein this coverage gap may be compensated by CE modes, i.e., $Q_{rxlevmin\_CE}$ and $Q_{qualmin\_CE}$. This is the scenario agreed that "2) relay UE has a Uu connection to the eNB and remote UE can be in extended coverage".

Observation 2: The normal coverage may be different in 3 dB between the UE power classes (Class 3 and Class 5), while the enhanced coverage may be controlled by the coverage specific values.

The invention claimed is:

1. A radio terminal, comprising:
a controller configured to execute one of a first control, a second control, and a third control, wherein
in the first control, the radio terminal directly transmits uplink information to be transmitted to a predetermined cell to the predetermined cell, and directly receives downlink information to be received by the radio terminal from the predetermined cell;
in the second control, the radio terminal transmits the uplink information to the predetermined cell via a relay terminal configured to execute a relay using a proximity-based service, and directly receives the downlink information from the predetermined cell;
in the third control, the radio terminal transmits the uplink information to the predetermined cell via the relay terminal, and receives the downlink information from the predetermined cell via the relay terminal;
the controller selects one of the first control, the second control, and the third control based on at least one of a reception level of a radio signal from the predetermined cell and a transmission level of the radio terminal;
the controller receives information of a second determination criterion defined by at least one of the reception level and the transmission level from the predetermined cell; and
the second determination criterion is used for determining an area in which the second control can be executed.

2. The radio terminal according to claim 1, wherein the controller executes the second control when the second determination criterion is satisfied and a first determination criterion for determining a coverage area of the predetermined cell is not satisfied.

3. The radio terminal according to claim 1, wherein the controller executes the second control only when the information of the second determination criterion has been received from the predetermined cell.

4. The radio terminal according to claim 1, wherein the controller receives, from the predetermined cell, information of a transmission power applied for execution of the second control.

5. The radio terminal according to claim 1, wherein the controller executes the second control when information of a radio resource used for the relay is directly received from the predetermined cell.

6. The radio terminal according to claim 1, wherein the radio terminal transmits a sidelink signal in the proximity-based service before starting the second control, and
the sidelink signal includes information for notifying the relay terminal that the radio terminal desires a relay of only the uplink information.

7. The radio terminal according to claim 1, wherein the radio terminal transmits a sidelink signal in the proximity-based service before starting the second control, and
the sidelink signal includes an identifier of the predetermined cell that is a transmission source of the downlink information.

8. The radio terminal according to claim 1, wherein the radio terminal receives a sidelink signal in the proximity-based service before starting the second control,
the sidelink signal includes an identifier of a cell in which another radio terminal that is a transmission source of the sidelink signal is located, and
the controller determines that the second control can be executed when the identifier of the cell indicates the predetermined cell.

9. The radio terminal according to claim 8, wherein the controller determines that the second control cannot be executed when the identifier of the cell does not indicate the predetermined cell.

10. The radio terminal according to claim 8, wherein the controller executes an operation for receiving the downlink information from the cell in which the other radio terminal is located when the identifier of the cell does not indicate the predetermined cell.

11. The radio terminal according to claim 1, wherein when the second control is executed, a first bearer for transmitting the uplink information to the predetermined cell via the relay terminal and a second bearer for directly receiving the downlink information from the predetermined cell are established, and
the first bearer and the second bearer are different.

12. A base station, comprising:
a transmitter configured to transmit information of a determination criterion, the determination criterion defined by at least one of a reception level of a radio signal from the base station and a transmission level of the radio terminal, to a radio terminal configured to execute one of a first control, a second control, and a third control, wherein in the first control, the base station directly receives, from the radio terminal, uplink information to be transmitted to the base station, and directly transmits, to the radio terminal, downlink information to be received by the radio terminal, in the second control, the base station receives the uplink information from the radio terminal via a relay terminal configured to execute a relay using a proximity-based service, and directly transmits the downlink information to the radio terminal, in the third control, the base station receives the uplink information from the radio terminal via the relay terminal, and transmits the downlink information to the radio terminal via the relay terminal, and the determination criterion is used for determining an area in which the second control can be executed.

* * * * *